Nov. 22, 1949     K. C. GAYNOR     2,489,024

RAIL CAR ROAD VEHICLE ASSEMBLY

Filed June 14, 1947     2 Sheets-Sheet 1

INVENTOR.
Keyes C. Gaynor
BY
Louis O. French
ATTORNEY

Nov. 22, 1949 K. C. GAYNOR 2,489,024
RAIL CAR ROAD VEHICLE ASSEMBLY
Filed June 14, 1947 2 Sheets-Sheet 2

INVENTOR.
Keyes C. Gaynor
BY
Louis O. French
ATTORNEY

Patented Nov. 22, 1949

2,489,024

UNITED STATES PATENT OFFICE 2,489,024

RAIL CAR ROAD VEHICLE ASSEMBLY

Keyes C. Gaynor, Sioux City, Iowa

Application June 14, 1947, Serial No. 754,681

4 Claims. (Cl. 105—368)

The invention relates to a transportation system and more particularly to an arrangement for transporting automobile trailer trucks on rail cars.

One object of the invention is to provide a rail car with means which permit an automobile trailer truck to be driven onto a rail car and secured thereto for transporting thereon or to be driven off the same by its tractor vehicle, thereby obviating the necessity of special land based hoisting equipment or turntables that have heretofore been employed.

A further object of this invention is to provide a rail car and an automobile trailer with cooperating interlocking connections which will prevent lateral or endwise shifting of the trailer when lowered to a carrying position upon the rail car.

A further object of the invention is to provide a rail car having spaced wheel pits for the rear wheels and landing gear wheels of a trailer truck with elevators mounted in said wheel pits adapted to lower the truck from a running position on the top floor of said rail car to an immobilized position upon said car.

The invention further consists in the several features hereinafter set forth and more particularly defined by claims at the conclusion hereof.

Figure 1:
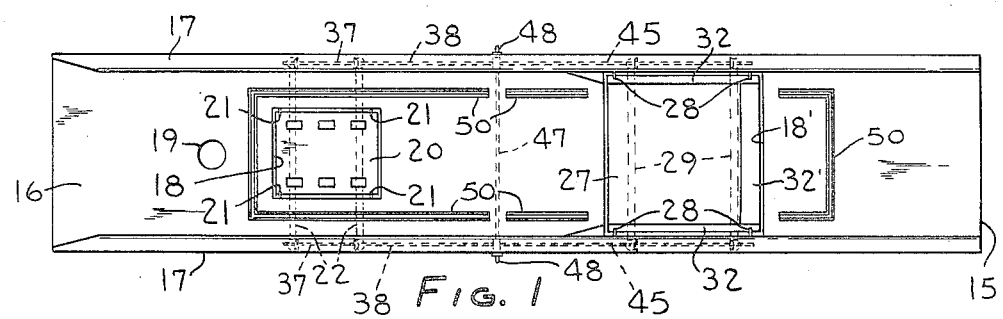
Fig. 1 is a plan view of a rail car embodying features of the invention.
Figure 2:
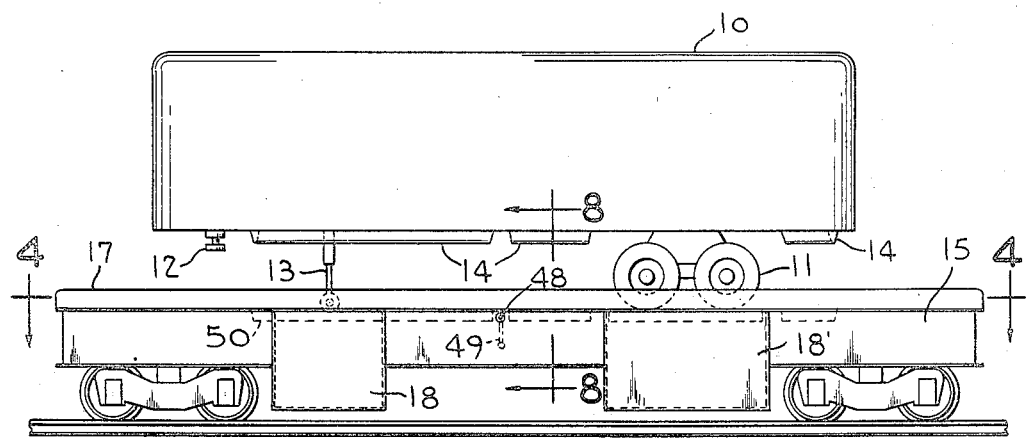
Fig. 2 is a side elevation view of a rail car and trailer truck embodying the invention showing the truck in position to be lowered.
Figure 3:
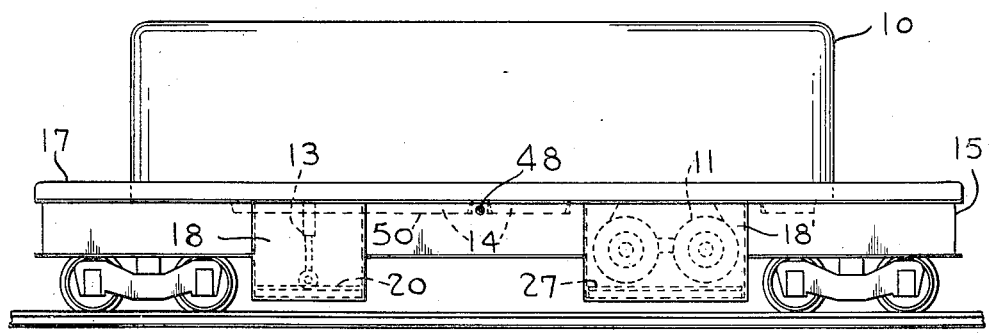
Fig. 3 is a view similar to Fig. 2 showing the truck in its lowered position.
Figure 8:
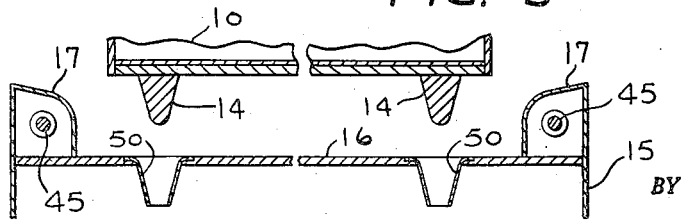
Fig. 8 is a vertical sectional view taken on the line 8—8 of Fig. 2, parts being broken away.
Figure 4:
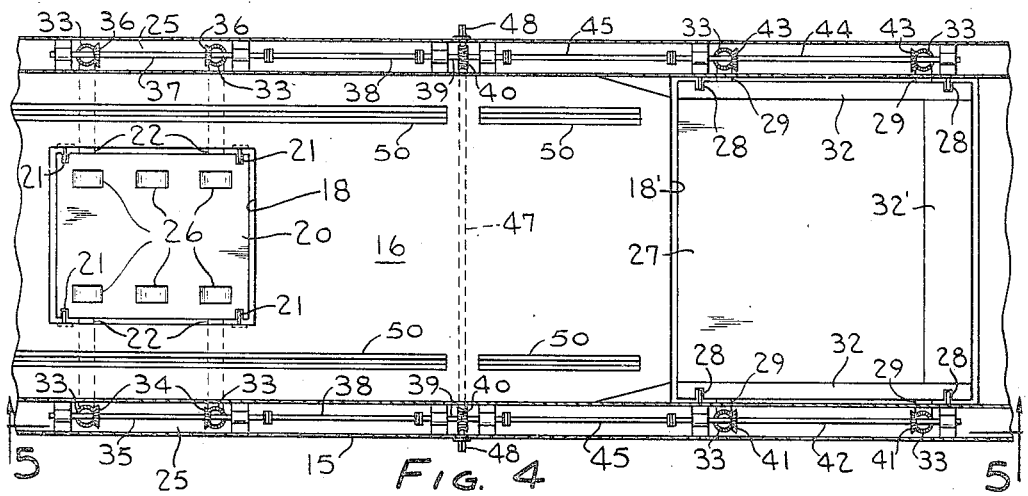
Fig. 4 is a detailed horizontal sectional view taken on the line 4—4 of Fig. 2.
Figure 5:
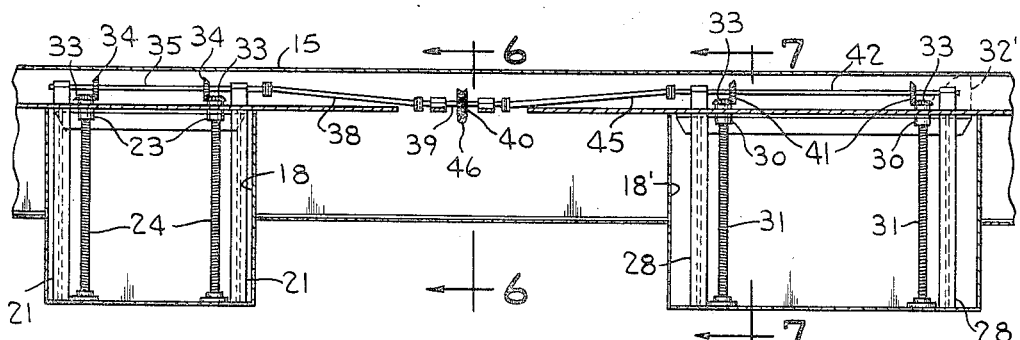
Fig. 5 is a vertical sectional view taken on the line 5—5 of Fig. 4.
Figure 6:
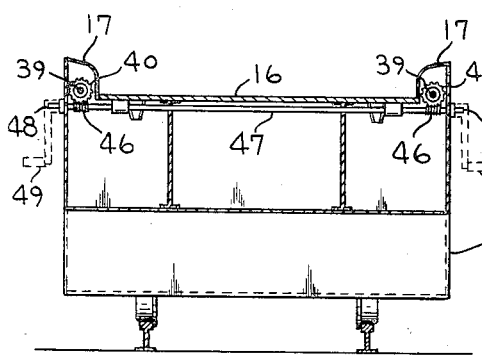
Fig. 6 is a vertical sectional view taken on the line 6—6 of Fig. 5.
Figure 7:
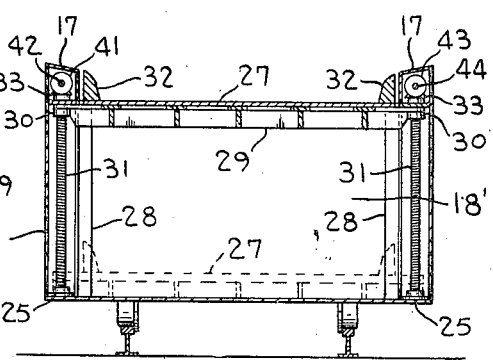
Fig. 7 is a vertical sectional view taken on the line 7—7 of Fig. 5.

Referring to the drawings, the numeral 10 designates an automobile trailer or trailer truck which is preferably of the type having rear wheels 11, a front king pin 12, and the usual foldable front landing gear wheels 13, said truck being of the type for the mounting of the pin 12 in the fifth wheel of a tractor truck, so that the trailer truck may be moved thereby. Unlike the ordinary trailer truck, the truck 10 also preferably is provided with tapered ribs 14 at its sides and ends which depend below the bottom of the body of the truck.

The rail car 15, such as a so-called flat car, may be of a length to carry a single trailer truck or of a length to take two trailer trucks, but inasmuch as the two trailer flat car involves a duplication of the mounting means for the single trailer truck, the flat car for a single trailer truck has been shown as it brings out the novel features of the invention, the only difference being that a flat car long enough to carry two trailer trucks would have the wheel pits for the carrying wheels of said trucks disposed in the central portion of the flat car body instead of at one end thereof.

Referring to the drawings, the rail car 15 is preferably of the flat car type having a flat top platform 16 and also provided with side rails 17 running substantially the length of the car. The car 15 is provided with wheel pits 18 and 18', the wheel pit 18 to receive the front landing gear wheels 13 and the wheel pit 18' to receive the rear wheels 11, and the depression 19 to receive the king pin 12.

The wheel pit 18 has an elevator platform 20 mounted for vertical sliding movement on guides 21 and carrying spaced cross beams 22 carrying nuts 23 which engage vertically disposed threaded shafts 24 mounted at the sides of the car in bearings on the bottom plate 25 of the pit 18. The platform 20 may have one or more sets of landing wheel receiving depressions 26.

The wheel pit 18' has an elevator platform 27 mounted for vertical sliding movement on guides 28 and carrying spaced cross beams 29 carrying nuts 30 which engage vertically disposed threaded elevator shafts 31 mounted at the sides of the car in bearings on the bottom plate 25 of the pit 18'. The platform 27 may have side rails 32 and a stop rail 32'.

Each shaft 24 and 31 is provided at its upper end with a bevel gear 33. The gears 33 for the shafts 24 on one side of the car mesh with bevel gears 34 on a shaft 35 and the gears 33 for the shafts 24 on the other side of the car mesh with bevel gears 36 on a shaft 37. The shafts 35 and 37 connect through universally jointed shafts 38 with shafts 39 carrying worm wheels 40, said shafts 39 being suitably journalled at the sides of the rail car.

The gears 33 for the shafts 31 on one side of the car mesh with bevel gears 41 on a shaft 42, and the gears 33 for the shafts 31 on the other side of the car mesh with bevel gears 43 on a shaft 44. The shafts 42 and 44 connect through universally jointed shafts 45 with the shafts 39 carrying the worm wheels 40.

The worm wheels 40 mesh with worms 46 on a transversely disposed shaft 47 journalled beneath the top 16 of the rail car and having extended polygonal ends 48 for engagement with a detachable hand crank 49 whereby said shaft 47 may be rotated so as to turn the shafts 39 and through the gearing connections above described turn the shafts 24 and 31 so as to either raise or lower the platforms 20 and 27 through the operative connection of the nuts 23 and 30 with said platforms.

The top 16 of the rail car is provided with tapering side depressions 50 adapted to receive or interlock with the ribs 14 at the sides and end of the trailer truck when the same is lowered onto the flat car, the tapering of these ribs and depressions acting to insure a proper alinement between the ribs and said depressions as the trailer truck is lowered to a carrying position. Suitable hold down clamps between the truck and the rail car may also be provided.

With the above construction, the loaded trailer truck may be driven onto the flat car by its tractor vehicle from a suitable loading platform to a position where the rear wheels 11 and the wheels 13 are disposed, respectively, on the platforms 20 and 27. The king pin 12 is then disconnected from the fifth wheel of the tractor vehicle and with the trailer truck properly alined both laterally and lengthwise of the rail car is then lowered to a carrying position on said car by lowering the platforms 20 and 27 until the ribs 14 engage in the recesses or depressions 50 and the bottom of said truck rests on the top platform 16 of the rail car in which position the auxiliary clamping means mentioned heretofore may be applied. In the carrying position the platforms 20 and 27 may be moved down free of the wheels 11 and 13 so that the gravitational forces due to the weight of the truck are transmitted through the body frame of the truck to the rail car.

When the rail car reaches its destination, the hold clamps are removed, the shaft 47 is turned so as to elevate the platforms 20 and 27 to bring the wheels 11 and 13 to a level with the top of the flat car, the tractor truck is then coupled with the trailer truck which is then driven off the flat car to its desired final destination.

I desire it to be understood that this invention is not to be limited to any particular form or arrangement of parts except in so far as such limitations are included in the appended claims.

What I claim as my invention is:

1. In a rail car and road vehicle assembly, the combination of a trailer truck having rear wheels and front landing means, a flat-type rail car having pits to receive said wheels and said landing means, elevators mounted in said pits and movable to a level with the top of said flat car to support said rear wheels and front landing means when said trailer truck is driven onto said flat car and permit lowering and raising said truck relative to said flat car, means for lowering said elevators with the rear wheels and front landing means thereon to bring portions of the body of said trailer truck into abutting engagement with said flat car, said abutting portions of said truck body having interlocking connections with parts of said rail car to prevent shifting movement of said truck relative to said rail car.

2. In a rail car and road vehicle assembly, the combination of a trailer truck having rear wheels and front landing means and depending rib portions at the sides and end thereof, a flat-type rail car having depressions at the sides and ends thereof to receive the rib portions of said truck when the same is lowered onto the top of said rail car, and vertically adjustable platform means on said car for receiving said rear wheels and landing means when said truck is driven onto said flat car to support the same for lowering and raising said truck relative to said flat car and for lowering the same to bring said rib portions on said truck into interlocking weight carrying engagement with said depressions in said rail car.

3. In a rail car and road vehicle assembly, the combination of a trailer truck having rear wheels and front landing means, a flat-type rail car having pits to receive said wheels and said landing means, elevators receiving said rear wheels and front landing means to support said truck in lowering the same onto said flat car and in raising the same therefrom vertically slidably mounted in said pits and movable to a level with the top of said flat car to permit driving said trailer truck onto said flat car, rotary threaded elevator shafts operatively connected to said elevators, a single driving shaft extending transversely of the rail car and gearing and shaft connections between said single shaft and said rotary elevator shafts.

4. In a rail car and road vehicle assembly, the combination of a trailer truck having rear wheels and a front landing means, a flat-type rail car having pits to receive said wheels and said landing means, elevators receiving said rear wheels and front landing means to support said truck in lowering the same onto said flat car and in raising the same therefrom mounted in said pits and movable to a level with the top of said flat car to permit driving said trailer truck onto said flat car, rotary elevator shafts for said elevators disposed on opposite sides of said rail car, a transversely disposed operating shaft and gearing and shaft connections between the elevator shafts at each side of the car with said transversely disposed driving shaft.

KEYES C. GAYNOR.

No references cited.